United States Patent
Swift et al.

(10) Patent No.: US 8,484,737 B1
(45) Date of Patent: Jul. 9, 2013

(54) TECHNIQUES FOR PROCESSING BACKUP DATA FOR IDENTIFYING AND HANDLING CONTENT

(75) Inventors: Jeremy Dean Swift, Plymouth, MN (US); Jeremy Howard Wartnick, Minnetonka, MN (US)

(73) Assignee: Symantec Corporation, Mountain View, CA (US)

( * ) Notice: Subject to any disclaimer, the term of this patent is extended or adjusted under 35 U.S.C. 154(b) by 561 days.

(21) Appl. No.: 12/268,122

(22) Filed: Nov. 10, 2008

(51) Int. Cl.
*H04L 29/06* (2006.01)
*G06F 15/173* (2006.01)
*G06F 11/00* (2006.01)
*G06F 12/14* (2006.01)
*G06F 12/16* (2006.01)

(52) U.S. Cl.
USPC .............................. 726/24; 709/224; 709/226

(58) Field of Classification Search
None
See application file for complete search history.

(56) References Cited

U.S. PATENT DOCUMENTS

| | | | |
|---|---|---|---|
| 2007/0094394 A1* | 4/2007 | Singh et al. | 709/226 |
| 2007/0106776 A1* | 5/2007 | Konno et al. | 709/223 |
| 2009/0193113 A1* | 7/2009 | Lunde | 709/224 |
| 2010/0037324 A1* | 2/2010 | Grant et al. | 726/27 |

* cited by examiner

*Primary Examiner* — Shin-Hon Chen
(74) *Attorney, Agent, or Firm* — Wilmer Cutler Pickering Hale and Dorr LLP

(57) ABSTRACT

Techniques for processing backup data for identifying and handling content are disclosed. In one particular exemplary embodiment, the techniques may be realized as a method for analyzing data for backup comprising analyzing data to identify target data, identifying target data, and handling the identified target data according to one or more pre-determined conditions.

20 Claims, 3 Drawing Sheets

US 8,484,737 B1

TECHNIQUES FOR PROCESSING BACKUP DATA FOR IDENTIFYING AND HANDLING CONTENT

FIELD OF THE DISCLOSURE

The present disclosure relates generally to techniques for processing backup data and, more particularly, to techniques for processing backup data for identifying and handling content.

BACKGROUND OF THE DISCLOSURE

Backup data may contain data that may be harmful to a computer system such as viruses, worms, or other malware. Backup data may also contain sensitive data such as personnel or human resources data, trade secret data, company proprietary data, medical data, and/or attorney-client privileged data. Bad data, such as malware, as well as sensitive data may be intermixed on a single backup with ordinary data. Also, backups may be handled and/or classified on a per unit basis, such as a backup image. Additionally, sensitive or bad data may be a small portion of a backup and it may be difficult to detect. As a result, an entire backup may have to be restricted if sensitive data is contained on it or an entire backup may have to be quarantined if malware is contained on it.

Furthermore, data may need to be retained for different periods depending on content. A myriad of policies may require data to be retained for personnel reasons, tax reasons, Sarbanes-Oxley requirements, compliance with legal discovery requests, and/or other legal retention policies. Data with different retention policies may be located on a same server or a same storage unit targeted for a single backup. A small portion of data legally required to be retained for a long period of time may be difficult to detect when interspersed with a large amount of data with a shorter retention period. Certain portions of data may have multiple retention periods. For example, data associated with a contract may be retained according to one policy for financial reasons and according to a second policy for litigation associated with the contract. This may result in an entire backup being duplicated and/or being retained for the longer of the two retention periods. In some cases, a backup may be classified for a first purpose such as litigation related retention, and may be overlooked for a second purpose such as human resources related retention.

Moreover, backup capacity is increasing. The ability to store a large amount of data on a single backup not only increases the possibility of bad data and/or sensitive data being interspersed with ordinary data, but also increases the possibility that more backups will contain garbage data, such as music, pictures, games or other data which may be installed by a user but of no value to an entity performing the backup. Similarly, shareware and unlicensed or expired software may be contained on a volume slated for backup and may be interspersed with valuable organization data.

Current backup technologies and procedures may enable only the classification and handling of backup data at a backup unit level, such as for the entire backup image. This may result in the propagation of bad data, the loss of valuable data, the misclassification of data, and the use of excess storage space for bad data and/or duplication of entire backup images for a small portion of the backup data. Additionally, when bad data is copied, archived, restored and/or replicated, the costs of storage may quickly increase.

In view of the foregoing, it may be understood that there may be significant problems and shortcomings associated with current backup processing and handling technologies.

SUMMARY OF THE DISCLOSURE

Techniques for processing backup data for identifying and handling content are disclosed. In one particular exemplary embodiment, the techniques may be realized as a method for analyzing data for backup comprising analyzing data to identify target data, identifying target data, and handling the identified target data according to one or more pre-determined conditions.

In accordance with other aspects of this particular exemplary embodiment, handling the data may comprise flagging the data.

In accordance with further aspects of this particular exemplary embodiment, handling the data may comprise omitting the data from a backup image.

In accordance with additional aspects of this particular exemplary embodiment, handling the data may comprise prompting a user.

In accordance with additional aspects of this particular exemplary embodiment, handling the data may comprise quarantining the data.

In accordance with additional aspects of this particular exemplary embodiment, handling the data may comprise removing the identified data from source data.

In accordance with additional aspects of this particular exemplary embodiment, handling the data may comprise creating a virtual image of one or more portions of backup data.

In accordance with additional aspects of this particular exemplary embodiment, handling the data may comprise creating a virtual synthetic image of one or more portions of backup data.

In accordance with additional aspects of this particular exemplary embodiment, the target data may comprise one of: a virus, a worm, confidential data, trade secret data, data to be retained for legal purposes, data to be produced for legal purposes, and data to be deleted.

In accordance with additional aspects of this particular exemplary embodiment, flagging the data may enable subsequent actions to be performed including at least one of: not restoring the data; not retrieving the data; prompting a user; creating a virtual image of the data; creating a virtual synthetic image of the data; deleting the data; and running a scan.

In accordance with additional aspects of this particular exemplary embodiment, analyzing data to identify target data may comprise an inline scan of data prior to creating a backup image.

In accordance with additional aspects of this particular exemplary embodiment, analyzing data to identify target data may comprise an offline scan of data subsequent to the creation of a backup image.

In accordance with additional aspects of this particular exemplary embodiment, the techniques may be realized as at least one processor readable storage medium for storing a computer program of instructions configured to be readable by at least one processor for instructing the at least one processor to execute a computer process for performing the method.

In another particular exemplary embodiment, the techniques may be realized as an article of manufacture for analyzing data for backup. The article of manufacture comprising at least one processor readable medium, and instructions carried on the at least one medium, wherein the instructions are configured to be readable from the at least one medium by at least one processor and thereby cause the at least one processor to operate so as to analyze data to identify target data, identify target data, and handle the identified target data according to one or more pre-determined conditions.

In yet another particular exemplary embodiment, the techniques may be realized as a system for analyzing data for backup. The system may comprise one or more processors communicatively coupled to a network, wherein the one or more processors are configured to analyze data to identify target data, identify target data, and handle the identified target data according to one or more pre-determined conditions.

In accordance with other aspects of this particular exemplary embodiment, handling the data may comprise at least one of: flagging the data; omitting the data from a backup image; prompting a user; quarantining the data; creating a virtual image of one or more portions of the backup data; creating a virtual synthetic image of one or more portions of the backup data; removing the identified data from source data; and initiating a virus scan.

In accordance with further aspects of this particular exemplary embodiment, handling the data may comprise deleting extraneous data prior to storage.

In accordance with additional aspects of this particular exemplary embodiment, the one or more processors may further be configured to utilize antivirus software to provide information associated with target data.

In accordance with additional aspects of this particular exemplary embodiment, the one or more processors may further be configured to update a backup catalog to contain one or more changes associated with a backup image.

In accordance with additional aspects of this particular exemplary embodiment, the target data may comprise one of: a virus, a worm, confidential data, trade secret data, data to be retained for legal purposes, data to be produced for legal purposes, and data to be deleted.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
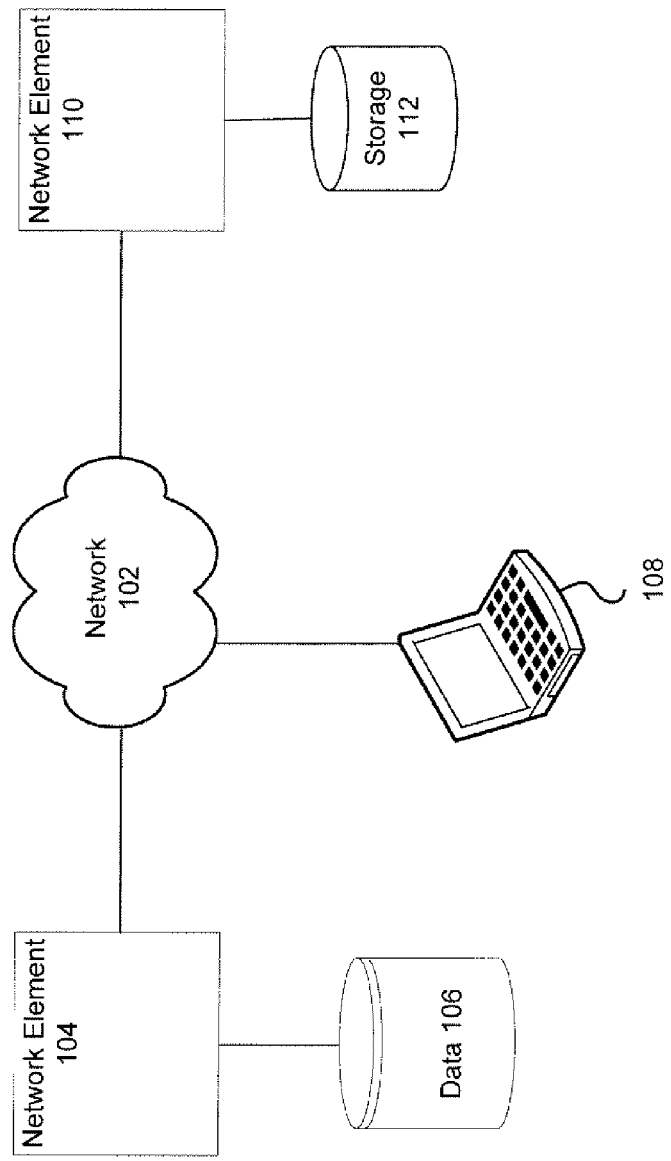
FIG. 1 shows a system for processing backup images in accordance with an embodiment of the present disclosure.

Referring to FIG. 1, there is shown a system 100 for processing backup images in accordance with an embodiment of the present disclosure. FIG. 1 is a simplified view of system 100, which may include additional elements that are not depicted. In system 100, network elements 104 and 110 may be communicatively coupled to network 102. Computer 108 may be communicatively coupled to network 102. Data 106 may be communicatively coupled to network element 104. Storage 112 may be communicatively coupled to network element 110.

Network 102 may be a local area network (LAN), a wide area network (WAN), the Internet, a cellular network, a satellite network, or another network that permits communication between network elements 104 and 110, computer 108, and other devices communicatively coupled to network 102.

Network elements 104 and 110 may be application servers, backup servers, network storage devices, media servers, or other devices communicatively coupled to network 102. Network elements 104 and 110 may utilize storage 112 for the storage of application data, backup data, or other data.

Network elements 104 and 110 may be hosts, such as an application server, which may process data traveling between themselves and a backup device, a backup process, and/or storage.

Network element 110 may be a backup server attached to storage 112. In one or more embodiments, network element 110 may be capable of processing data received from or transmitted to storage 112. In other embodiments, network element 110 may represent a network appliance connected to a Storage Area Network (SAN).

Computer 108 may be a desktop computer, a laptop computer, a server, or other computer capable of performing private network backbone analysis. Computer 108 may receive data from user input, a database, a file, a web service, and/or an application programming interface. Computer 108 may query other systems and/or local or remote storage such as data 106, network elements 104 and 110, and storage 112 to obtain backup information.

Data 106 may be network accessible storage and may be local, remote, or a combination thereof to network elements 104, and 110. Data 106 may utilize a tape, disk, a storage area network (SAN), or other computer accessible storage. In one or more embodiments, data 106 may represent a database or another application instance.

In one or more embodiments, data from storage 112 may be data for which a backup is being performed. Network element 110 may be a backup server which may handle requests for backup data. For example, network element 104 may be an application server or a database server seeking to backup data. Network element 110 may analyze backup data as the backup data is being received to determine if the backup data meets one or more target criteria. For example, target criteria may include criteria to identify one or more of: a virus, a worm, confidential data, trade secret data, data to be retained for legal purposes, data to be produced for legal purposes, and/or data to be deleted. Network element 110 may contain target criteria, receive target criteria via an interface, or query target criteria from a database or other storage either local or remote from network element 110. For example, network element 110 may utilize data and/or computer code associated with anti-virus software to obtain one or more criteria to identify viruses, worms, cookies, or other potential malware in the data destined for backup. If data meeting one of the criteria is identified during a backup process, and before data is written to a backup image, one or more actions may be taken. For example, the identified data may be omitted from the backup, the source data may be deleted, the identified data may be flagged, a user may be prompted, the identified data may be quarantined, a virtual image of one or more portions of the backup data may be created, a virtual synthetic image of one or more portions of the backup data may be created, the identified data may be removed the from source data, and/or a virus scan may be initiated.

Network element 110, acting as a component of a backup process, such as a backup server, may query and/or receive data from other sources to obtain target criteria. For example, network element 110 may query or receive data associated with litigation keywords. The litigation keywords may be utilized by network element 110 to identify one or more portions of data in backup data, such as a backup data stream received by network element 110, which are associated with one or more pending lawsuits. If network element 110 identifies one or more portions of data associated with litigation keywords, it may take one or more actions. For example, network element 110 may create a virtual image of that portion of the backup data. Thus, when the backup is completed, the litigation data may be contained in a first backup and also may be referenced by a virtual image, which may point to only a relevant subset of the data for providing to a proper group, such as a legal department. Network element 110 may also take other actions, such as prompting a user at a user interface, or prompting a user with a notification, such as an email, text message, printout, and/or report.

Another example of identifying target criteria may include pattern matching for sensitive data such as account numbers, medical records, social security numbers, and/or personnel information. The presence of such data may determine how a backup is classified, whether a backup is archived off-site, or how access may be granted to a backup. Target criteria may include strings, files sizes, file names, file creation dates, file modification dates, key words, data creator identity (e.g., author), data editor identity, data permissions, file extensions, data types, a blacklist, and/or other data or file attributes or content attributes. Target criteria searching may utilize exact matches, ranges, partial matches, virus signatures, or other searching and/or identification techniques. In one or more embodiments, target criteria may utilize information of known or safe data and may identify one or more portions of data in a backup not corresponding to the known or safe data (e.g., a whitelist).

In addition to taking an action in response to identified target data prior to creation of a backup (e.g., inline processing of a backup), data may be marked or other indicators may be stored for subsequent processing (e.g., offline processing of a backup or subsequent actions associated with a backup). Additionally, analysis of backup data and identification of target data may be performed subsequent to creation of the backup. For example, prior to a restoration, duplication, mirroring, archiving, deletion, or other data manipulation process, a backup image may be scanned for target data and one or more actions may be performed. For example, prior to deletion, data may be scanned for keywords indicating required retention for one or more legal reasons. In another example, network element 110 may update a backup catalog, metadata of a backup, or other data associated with the backup to change a classification of data. The changed classification may affect storage location, access rights, the retention period, and/or permissible actions for the backup data. In one or more embodiments, network element 110 may flag the identified data and no further actions may need to be taken during the backup. The flag of the identified data may be stored in a variety of locations and formats and may enable refined subsequent processing. For example, a flag may be set in a catalog, in backup metadata, in a separate flag file, or in another data structure or storage location. The flag may identify a starting block of identified data, starting and ending blocks, a sector, a file name, and/or other data attributes. Flags may contain an identifier, a type, or other formats which may link to or provide associated information such as a target data type. For example, there may be different types of flags for viruses, worms, confidential data, trade secrets, garbage data, or other data classifications. In one or more embodiments, a system or method for processing data for storage may set a flag for only one type of data, such as a virus. A subsequent process encountering a flag may thus determine how to handle the flagged data. For example, an antivirus process upon detecting the flag may delete the data, quarantine the data, and/or scan the source data (e.g., an application server on network element 104). A restoration process upon encountering a flag may avoid restoring one or more portions of the backup. An archive process may omit the flagged data from the archive. Flags may also enable a subsequent creation of virtual images or virtual synthetic images and/or a classification of data for retention purposes. For example, a financial database or other system may provide keywords or other identifiers to flag data whose retention is required for Sarbanes-Oxley compliance.

Other target identifiers may be utilized for other compliance purposes. For example, license files of expired software may identify software to be removed. Other file and/or data attributes may identify unlicensed software, freeware, and/or shareware. Target identifiers and/or file or data attributes may identify unauthorized data installed by users such as games, pictures, music, and/or personal programs. Such identified data may be marked for one or more actions, such as deletion prior to backup and/or storage, removal from an existing backup, and/or omission of such data during restoration or archival.

Analysis of backup data and identification of target data may occur on or more components. As discussed above, in one or more embodiments, one or more portions of processing associated with the analysis and handling of backup data may occur on a backup server, such as network element 110. In some embodiments, analysis and/or processing may occur on a backup client such as network element 104. In some embodiments, analysis and/or processing may occur at an interface to a backup management system, such as computer 108. Processing may occur in multiple places for multiple purposes. For example, prior to transmission of backup data to a backup server, a backup client may analyze data for garbage data, such as games, music, pictures, or personal user files. A backup server may analyze received backup data either inline or offline for viruses or other target data. An interface to a backup management system, such as computer 108, may also perform one or more analysis and/or processing actions. For example, computer 108 may scan a backup image for target data and/or perform one or more actions on identified target data.

Figure 2:
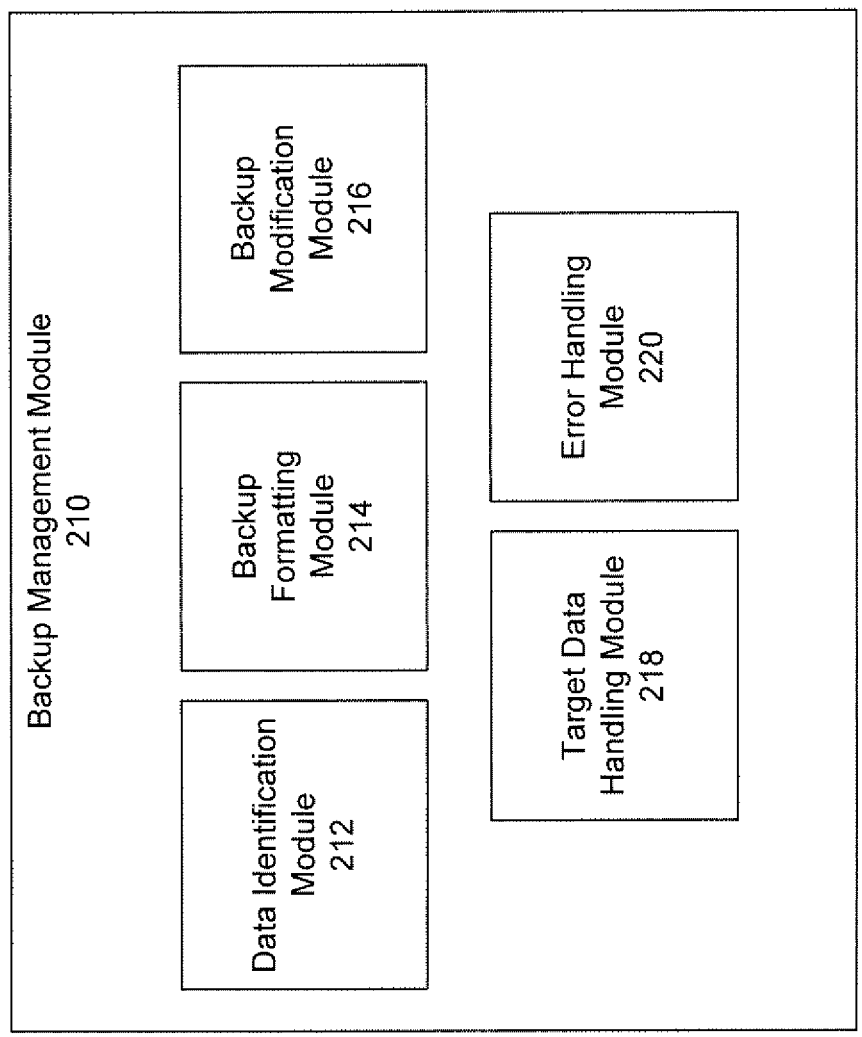
FIG. 2 shows a module for processing backup images in accordance with an embodiment of the present disclosure.

Referring to FIG. 2, there is shown a backup management module 210 for processing backup images in accordance with an embodiment of the present disclosure. One or more modules of FIG. 2 may be implemented in one or more components discussed in reference to FIG. 1 above. For example, one or more components of backup management module 210 may be implemented on network element 110, network element 104, and/or computer 108. As shown in FIG. 2, backup management module 210 may contain one or more components including data identification module 212, backup formatting module 214, backup modification module 216, target data handling module 218, and error handling module 220.

Data identification module 212 may analyze one or more portions of data and identify one or more portions of data associated with target criteria. Data identification module 212 may query a database or another application, in order to obtain target criteria. Data identification module 212 may also contain one or more interfaces to receive target criteria. In one or more embodiments, data identification module 212 may utilize software associated with a virus checker to obtain target criteria. Data identification module 212 may identify files and/or data in accordance with target criteria and provide locations of identified data to one or more other modules. For example, data identification module 212 may identify a virus, a worm, confidential data, trade secret data, data to be retained for legal purposes, data to be produced for legal purposes, and/or data to be deleted. Data identification module 212 may then provide the address of identified data to backup formatting module 214 in the event that analysis of backup data is being performed inline, or to backup modification module 216 in the event that analysis of backup data is performed after a backup (e.g., offline).

Backup formatting module 214 may enable one or more actions to performed to a backup during creation of the backup. For example, backup formatting module 214 may omit one or more portions of identified data from a backup, quarantine one or more portions of identified data, flag one or more portions of identified data, and/or perform other actions or handling of data. In some embodiments, backup formatting module 214 may utilize one or more pre-determined conditions to determine how to handle one or more portions of identified data.

Backup modification module 216 may enable one or more actions to be performed on a backup after creation of the backup. Backup modification module 216 may also create backup data structures, such as virtual backups and/or virtual synthetic backups. In one or more embodiments, backup modification module 216 may compress, encrypt, or otherwise prepare backup data structures for transmission or storage. Backup modification module 216 may delete one or more portions of identified data from a backup, quarantine one or more portions of identified data, flag one or more portions of identified data, and/or perform other actions or handling of data. In some embodiments, backup modification module 216 may utilize one or more pre-determined conditions to determine how to handle one or more portions of identified data.

Target data handling module 218 may enable one or more additional actions to be performed to an inline or offline backup. For example, target data handling module 218 may generate a notification, prompt a user, archive data, classify data, initiate a scan, or provide other functionality in response to one or more target criteria. Target data handling module 218 may utilize one or more pre-determined conditions to determine how to handle one or more portions of identified data.

Error handling module 220 may handle errors with scanning of backup data, handling of identified data corresponding to target criteria, and/or obtaining or receiving target criteria. Error handling module 220 may log errors such as errors occurring during identification of data corresponding to target criteria, during creation of backup data structures, during handling of identified data, during transmission of backup data structures, and during other backup scanning and data handling error related events.

Figure 3:
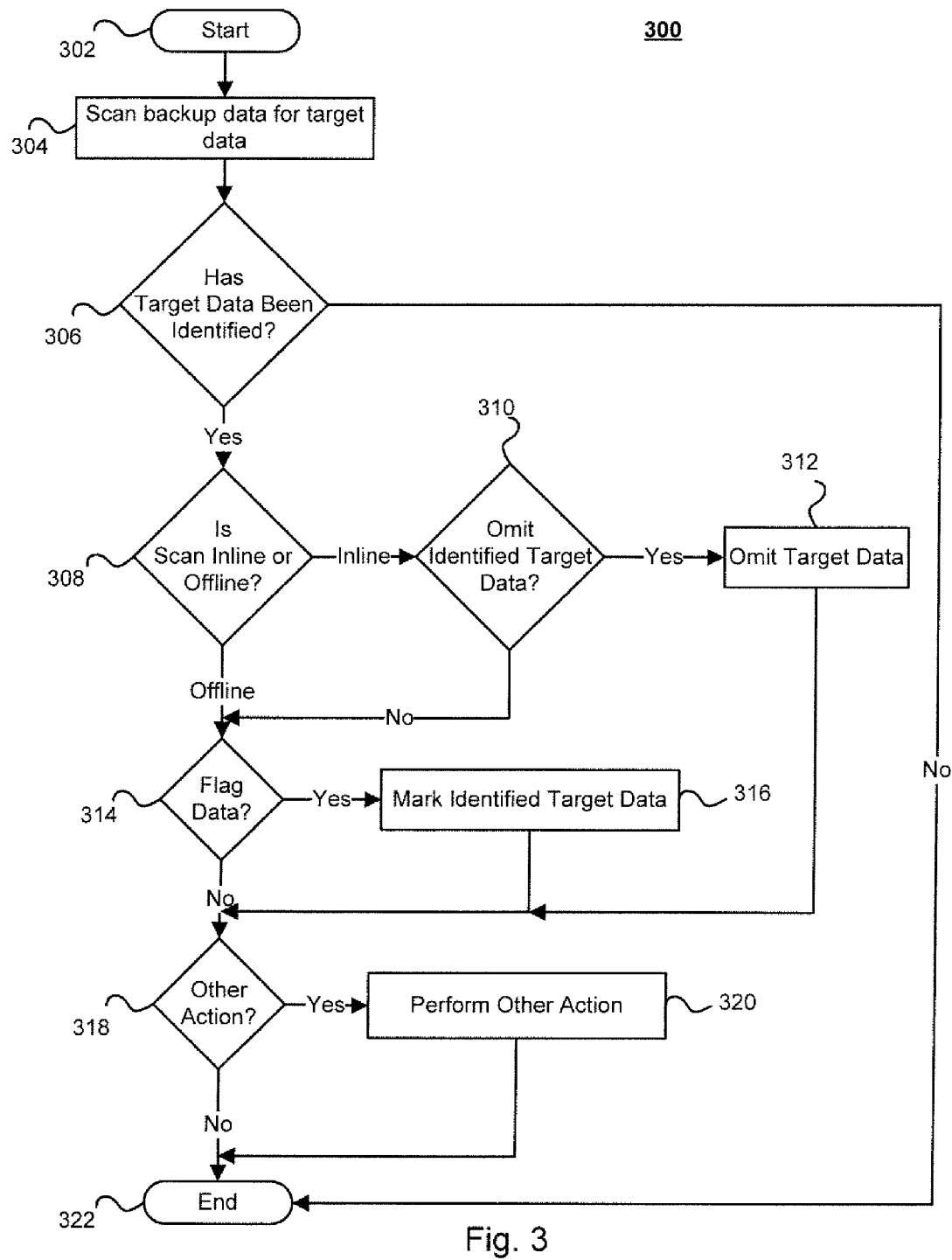
FIG. 3 depicts a method for processing backup images in accordance with an embodiment of the present disclosure.

Referring to FIG. 3, there is depicted a method 300 for processing backup images in accordance with an embodiment of the present disclosure.

At block 302, the method 300 for processing backup images may begin.

At block 304, the method 300 may scan backup data for target data. The method 300 may utilize pre-determined target criteria, may query and/or download target criteria prior to scanning, or may receive target criteria via an interface. Scanning may include one or more search methods to identify data associated with target criteria.

At block 306, the method 300 may determine whether data associated with target criteria has been identified. If data associated with target criteria has been identified, the method 300 may continue at block 308. If data associated with target data has not been identified, the method 300 may end at block 322.

At block 308, the method 300 may determine whether the scan is inline or offline (i.e., being performed during a backup or subsequent to a backup). If a scan is inline, the method 300 may continue at block 310. If a scan is offline, the method 300 may continue at block 314.

At block 310, the method 300 may determine whether to omit target data from a backup. The method 300 may remove data being written to an image, ignore data received in a stream or perform other actions. For example, if a virus and/or other malware is identified, it may be omitted from the backup. If identified target data is omitted from a backup, the method 300 may continue at block 312. If identified target data is not omitted from a backup, the method 300 may continue at block 314.

At block 312, the method 300 may omit identified target data from a backup. In one or more embodiments, the method 300 may continue at block 318.

At block 314, the method 300 may determine whether to flag identified target data. If identified target data is to be flagged, the method 300 may continue at block 316. If identified target data is not to be flagged, the method 300 may continue at block 318.

At block 316, the method 300 may flag identified target data. Data flagging may utilize a variety of methods and locations. Data may be flagged in a backup catalog, in backup file metadata, in an external flag data structure, in the data structure of identified data itself, or in other locations. A data flag may identify a starting block of identified data, starting and ending blocks, a sector, a file name, and/or other data attributes. Data flagging may enable one or more subsequent actions to be performed.

At block 318, the method 300 may determine if one or more other actions are to be taken. If one or more other actions are to be taken, the method 300 may continue at block 320. If one or more other actions are not to be taken, the method 300 may end at block 322.

At block 320, the method 300 may perform one or more other actions. For example, the method 300 may delete identified target data from a previously created backup image, quarantine data, initiate a virus scan, create a virtual image of one or more portions of backup data, create a virtual synthetic image of one or more portions of backup data, send a notification, prompt a user, skip a portion of identified data during a restoration, skip a portion of identified data during archival, and/or perform other actions.

At block 322, the method 300 may end.

At this point it should be noted that processing backup data in accordance with the present disclosure as described above typically involves the processing of input data and the generation of output data to some extent. This input data processing and output data generation may be implemented in hardware or software. For example, specific electronic components may be employed in a module for processing backup data or similar or related circuitry for implementing the functions associated with processing backup data in accordance with the present disclosure as described above. Alternatively, one or more processors operating in accordance with instructions may implement the functions associated with processing backup data in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for analyzing data for backup comprising:
    analyzing data of a backup image to identify target data, using at least one computer processor, wherein analyzing data to identify target data comprises determining if the data meets one or more target criteria, wherein the one or more target criteria include at least one of: criteria to identify confidential information; criteria to identify trade secret data; criteria to identify data to be retained for legal purposes; and criteria to identify data to be produced for legal purposes;
    identifying target data;
    flagging, in a backup catalog, the identified target data of the backup image using at least one of a plurality of types of flags, each type of flag providing an indicator for subsequent processing; and
    processing the identified target data according to one or more pre-determined conditions based on the type of flag associated with the identified target data.

2. The method of claim 1, wherein processing the data comprises removing the data from a backup image.

3. The method of claim 1, wherein processing the data comprises prompting a user.

4. The method of claim 1, wherein processing the data comprises quarantining the data.

5. The method of claim 1, wherein processing the data comprises removing the identified data from source data.

6. The method of claim 1, wherein processing the data comprises creating a virtual image of one or more portions of backup data.

7. The method of claim 1, wherein processing the data comprises creating a virtual synthetic image of one or more portions of backup data.

8. The method of claim 1, wherein the target data comprises one of: a virus, a worm, confidential data, trade secret data, data to be retained for legal purposes, data to be produced for legal purposes, and data to be deleted.

9. The method of claim 1, wherein flagging the data enables subsequent actions to be performed including at least one of: not restoring the data; not retrieving the data; prompting a user; creating a virtual image of the data; creating a virtual synthetic image of the data; deleting the data; and running a scan.

10. The method of claim 1, wherein analyzing data to identify target data comprises an inline scan of data prior to creating a backup image.

11. The method of claim 1, wherein analyzing data to identify target data comprises an offline scan of data subsequent to the creation of a backup image.

12. At least one non-transitory processor readable storage medium for storing a computer program of instructions configured to be readable by at least one processor for instructing the at least one processor to execute a computer process for performing the method as recited in claim 1.

13. The method of claim 1, wherein subsequent processing includes at least one of: omitting material flagged as a virus from an archive based on a type of flag associated with the omitted material; omitting material flagged as a virus from a restoration based on a type of flag associated with the omitted material; archiving data flagged for legal compliance based on a type of flag associated with the data; removing data flagged as software with expired licenses, removing data flagged as unauthorized; and omitting data flagged as unauthorized from restoration.

14. An article of manufacture for analyzing data for backup, the article of manufacture comprising:
    at least one non-transitory processor readable storage medium; and
    instructions carried on the at least one medium;
    wherein the instructions are configured to be readable from the at least one medium by at least one processor and thereby cause the at least one processor to operate so as to:
        analyze data of a backup image to identify target data, wherein analyzing data to identify target data comprises determining if the data meets one or more target criteria, wherein the one or more target criteria include at least one of: criteria to identify confidential information; criteria to identify trade secret data; criteria to identify data to be retained for legal purposes; and criteria to identify data to be produced for legal purposes;
        identify target data;
        flag, in a backup catalog, the identified target data of the backup image using at least one of a plurality of types of flags, each type of flag providing an indicator for subsequent processing; and
        process the identified target data according to one or more pre-determined conditions based on the type of flag associated with the identified target data.

15. A system for analyzing data for backup comprising:
    one or more processors communicatively coupled to a network;
    wherein the one or more processors are configured to:
        analyze data of a backup image to identify target data, wherein analyzing data to identify target data comprises determining if the data meets one or more target criteria, wherein the one or more target criteria include at least one of: criteria to identify confidential information; criteria to identify trade secret data; criteria to identify data to be retained for legal purposes; and criteria to identify data to be produced for legal purposes;
        identify target data;
        flag, in a backup catalog, the identified target data of the backup image using at least one of a plurality of types of flags, each type of flag providing an indicator for subsequent processing; and process the identified target data according to one or more pre-determined conditions based on the type of flag associated with the identified target data.

16. The system of claim 15, wherein processing the data comprises at least one of: flagging the data; removing the data from a backup image; prompting a user; quarantining the data; creating a virtual image of one or more portions of the backup data; creating a virtual synthetic image of one or more portions of the backup data; removing the identified data from source data; and initiating a virus scan.

17. The system of claim 15, wherein processing the data comprises deleting extraneous data.

18. The system of claim 15, wherein the one or more processors are further configured to utilize antivirus software to provide information associated with target data.

19. The system of claim 15, wherein the one or more processors are further configured to update a backup catalog to contain one or more changes associated with a backup image.

20. The system of claim 15, wherein the target data comprises one of: a virus, a worm, confidential data, trade secret data, data to be retained for legal purposes, data to be produced for legal purposes, and data to be deleted.

* * * * *